G. NEWTON.
Spring-Bar for Vehicles.
No. 226,415. Patented April 13, 1880.
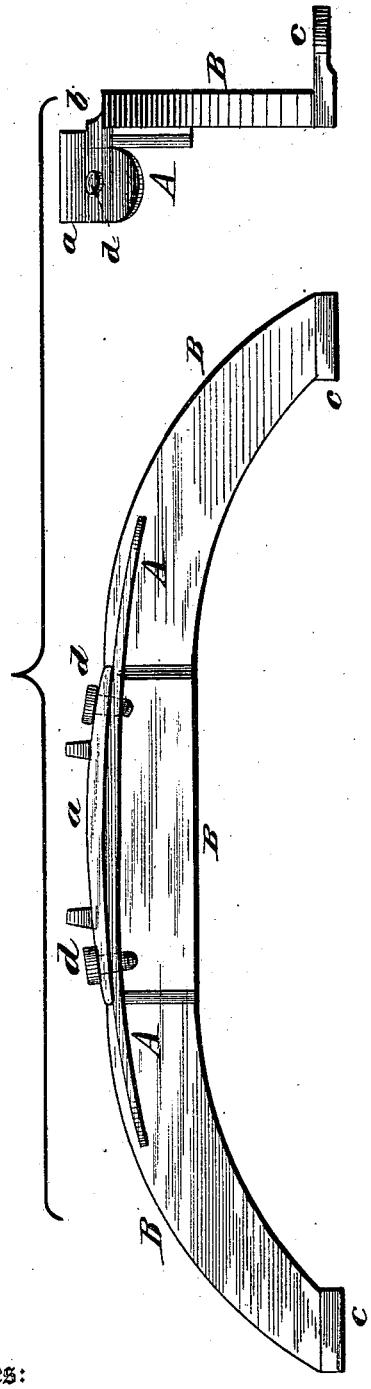
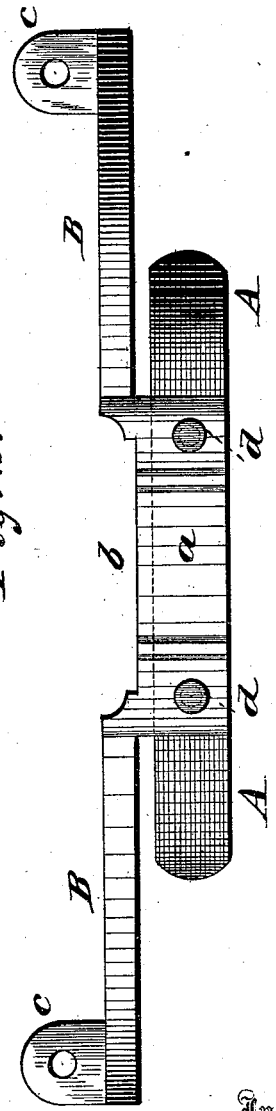

UNITED STATES PATENT OFFICE.

GEORGE NEWTON, OF STERLING, ILLINOIS.

SPRING-BAR FOR VEHICLES.

SPECIFICATION forming part of Letters Patent No. 226,415, dated April 13, 1880.

Application filed October 24, 1879.

*To all whom it may concern:*

Be it known that I, GEORGE NEWTON, of Sterling, in the county of Whiteside and State of Illinois, have invented certain new and useful Improvements in Spring-Bars for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to an improved method of attaching the bodies of spring-vehicles to the running-gear thereof; and it consists, essentially, of an improved spring-bar and body-loop.

Figure 1 shows a side elevation and end elevation of my invention. Fig. 2 is a plan view of the same.

The remaining parts of the vehicle are so well known as not to require description herein, and the mode of attaching my improvement can be readily understood by reference merely to such other parts of the vehicle.

A represents the ordinary spring. B is a pendent spring-bar. At the center of the bar B, I provide the projecting cap $a$, the latter resting upon the top of the spring, and fastened to the spring either by vertical bolts or inclosing-clips. At the inner edge of the cap $a$, and on the inner side of the bar B, I form the recess $b$, to permit the passage of a clip or clips around the cap $a$ and spring A without protruding beyond the line of the inner surface of the bar B. At both ends of the bar B, and at right angles with the inner face thereof, I provide the shelves $c$ $c$.

I construct the bar B, including the cap $a$ and shelves $c$ $c$, in one piece, and I prefer to cast the same in malleable iron, as the cheapest and strongest material.

My invention is calculated for use on side springs as well as on end springs.

The operation is as follows: After the spring is placed the bar B is brought against the inner line thereof, with the cap $a$ resting on the top of the spring, and two clips are passed around the bar B and the spring A at about the point shown by the rivets $d$ in the drawings, and fastened in the usual way.

In practical operation the bar B will be of the same width as the thickness of the spring at the point of junction of such parts, and as the cap $a$ extends over the full width of the spring A, and the bar B being in width the thickness of the spring, there is a solid square-sided body for the clips to encircle.

The back of the recess $b$ is thrown beyond the outer line of the bar B, so as to give such recess sufficient depth for the reception of the clips, and also to form a back which shall lie contiguous to the inner edge of the spring A, and yet leave an interval between the ends of the leaves of the spring and the side of the bar B, to prevent abrasion of the latter by the action of the ends of such leaves.

If preferred, the cap $a$ may be bolted or riveted to the spring A.

After the bar B is affixed to the spring A, if the same be an end spring, the front end of the body of the vehicle is brought against the inner face of the bar B and rested upon the shelves $c$ $c$, and is attached by small bolts passing through the frame of the vehicle and the shelves $c$ $c$. Of course the mode of attachment at the rear spring is the same.

Should the spring be a side spring the operation is the same, except that the sides of the vehicle, instead of the ends, are placed on the shelves $c$ $c$.

On the end springs I would make the bar B extend the full width of the body of the vehicle, to prevent lateral rocking. On the side spring the bar B may be made of any desired length, though I find the length of eighteen inches works well.

The advantages of my invention are, that it allows the body of the vehicle to be swung low without the intervention of long body-loops; also, by bringing the body of the vehicle against the inner face of the bar B, such contiguous parts act as braces for each other.

Also, my invention dispenses with the ordinary wooden spring-bar, which is liable to be cut out by the iron body-loops, so that the bolts become loosened and come out. By bolting from the bottom through the shelves *c c* the attachment is made through the solid frame of the body of the vehicle, and thus rendered secure.

What I claim as my invention, and desire to secure by Letters Patent, is—

1. As a means of attaching the body of a vehicle to the springs thereof, the bar B, having the cap *a*, recess *b*, and shelves *c c*, constructed substantially as shown, and for the purpose described.

2. In combination with the spring A of the vehicle, the bar B, having the cap *a* and shelves *c c*, substantially as described, and for the purpose mentioned.

3. The bar B, provided with the cap *a*, in combination with the spring A, substantially as shown and described.

In testimony that I claim the foregoing I have hereunto set my hand this 13th day of October, 1879.

GEORGE NEWTON.

Witnesses:
W. S. WARD,
JNO. J. CUSHING.